United States Patent [19]

Kobari et al.

[11] Patent Number: 4,680,525
[45] Date of Patent: Jul. 14, 1987

[54] INDUCTION MOTOR DRIVING SYSTEM

[75] Inventors: Katsuo Kobari, Tachikawa; Hiroshi Ishida, Tokyo, both of Japan

[73] Assignee: Fanuc Ltd, Minamitsuru, Japan

[21] Appl. No.: 728,467

[22] Filed: May 2, 1985

Related U.S. Application Data

[63] Continuation of Ser. No. 413,334, Aug. 23, 1982, abandoned.

[30] Foreign Application Priority Data

Dec. 30, 1980 [JP] Japan ............................ 55-186753

[51] Int. Cl.⁴ .............................................. H02P 5/40
[52] U.S. Cl. ....................................... 318/798; 318/806
[58] Field of Search ......... 318/798, 806, 803, 807–811

[56] References Cited

U.S. PATENT DOCUMENTS

| | | | |
|---|---|---|---|
| 3,551,779 | 12/1970 | Campbell | 318/801 |
| 4,047,083 | 9/1977 | Plunkett | 318/807 |
| 4,099,108 | 7/1978 | Okawa et al. | 318/808 |
| 4,263,541 | 4/1981 | Okado | 318/802 |
| 4,361,794 | 11/1982 | Kawada et al. | 318/811 |
| 4,384,244 | 5/1983 | Matsumoto | 318/811 |

FOREIGN PATENT DOCUMENTS 55-74377  6/1980  Japan .

Primary Examiner—David Smith, Jr.
Attorney, Agent, or Firm—Staas & Halsey

[57] ABSTRACT

The drive system of an induction motor wherein the exciting current command value $I_o$ of the induction motor (14) is held constant and the rotational speed thereof is caused to quickly respond to a command speed by the vector control circuit the induction motor (104) has exceeded a predetermined speed, an exciting current amplitude-controlling circuit (51) increases the exciting current command value in accordance with the rotational speed. The level of the driving supply voltage of the induction motor is sensed by a supply voltage output circuit (52), whereupon the exciting current amplitude-controlling circuit (51) is controlled so that the predetermined speed serving as a threshold value for changing the exciting current command value may be increased in accordance with the sensed level.

4 Claims, 15 Drawing Figures (b)

INDUCTION MOTOR DRIVING SYSTEM

This is a continuation of co-pending application Ser. No. 413,334 filed on Aug. 23, 1982 now abandon.

BACKGROUND OF THE INVENTION

The present invention relates to an induction motor driving system, and more particularly to an induction motor driving system which can perform quick-response control of an induction motor at high speed and which can prevent the generation of heat by the induction motor.

The drive control of an induction motor wherein direct current is changed into alternating current by an inverter circuit and wherein the induction motor is driven by the alternating current, has been known as variable-frequency control (VF control) or variable-voltage variable-frequency control (VVVF control).

VF control is a method in which primary frequency, which is the output of the inverter circuit is varied in accordance with a command speed, while VVVF control is control in which the amplitude of the primary voltage is also varied in proportion to the variation of the primary frequency so as to control an output torque to a constant magnitude.

The conventional control systems as stated above deal with voltage and current to be applied to the induction motor, on the basis of the amplitude and frequency. Since they are control systems having a mean value fashion, they are incapable of fine control having quick-response. In order to ameliorate such a drawback, there has recently been developed and put into practical use a so-called "vector control system" which employs the pulse width control system and which controls the instantaneous value of the stator current of an induction motor, whereby the generation of a torque, truly equivalent to that of a shunt D.C. machine, can be effected. That is, the vector control system of the induction motor is based on the torque generating principle of the shunt D.C. machine and controls the instantaneous value of the stator current to perform the torque generation equivalent to that of the shunt D.C. machine.

In this manner, the vector control system makes instantaneous value control possible. However, as the rotational speed of the induction motor becomes high, the frequency of the primary current command becomes high. When using a transistor inverter, the high primary frequency approximates the chopping frequency of a transistor constituting the inverter, and the waveform of the primary input voltage approximates a rectangular wave, so that the current loop gain of the system declines. With the low current loop gain of the system, the current as commanded fails to flow through the induction motor.

Effective for eliminating such disadvantage is a method in which the vector control is shifted to the so-called slip control with a predetermined speed serving as the boundary. In this slip control, when the driving supply voltage of the induction motor is substantially constant, no problem occurs, but when it rises above a predetermined level, problems such as the generation of heat take place. It is therefore favorable to hold the driving supply voltage substantially constant. It is also desirable on the manufacturing side to manufacture the same driving devices for domestic needs and for foreign needs. In such case, however, the driving supply voltages differ widely. For example, the driving supply voltage is 200 V±10% in Japan and is 230 V±10% in U.S., so that it fluctuates from 180 V to 250 V. In other words, the supply voltage of 230 V±10% is applied to the driving device designed for 200 V±10%. In slip control, accordingly, the induction motor is overexcited (exciting current flows excessively) and generates heat, with the hazard of breakdown. Therefore, the quick-response of control of the induction motor and the safety of the equipment are not always compatible.

SUMMARY OF THE INVENTION

It is accordingly an object of the present invention to provide an induction motor driving system having a quick-response in which the current as commanded can be caused to flow through an induction motor even when the rotational speed becomes high as in the case of controlling the induction motor by vector control. In the present invention, in an induction motor driving system wherein an induction motor is controlled by vector control so that an exciting current command value may become constant, the above-mentioned object is accomplished by increasing the exciting current command value in accordance with the rotational speed of the induction motor when the rotational speed has exceeded a predetermined value. This means that vector control is shifted to a so-called slip control at the predetermined speed. When employing a slip control system, as stated before, no problem is posed when the driving supply voltage of the induction motor is substantially constant, but problems including the generation of heat are encountered when the driving supply voltage rises above a predetermined level.

It is accordingly a second object of the present invention to provide an induction motor driving system in which there are no problems such as the generation of heat even when the driving supply voltage has fluctuated. Toward the accomplishment of the object, an induction motor driving system is provided wherein when the rotational speed of an induction motor reaches a predetermined speed, an exciting current command value is increased in accordance with the rotational speed, the present invention adopts a driving system in which the level of the driving supply voltage of the induction motor is detected and in which the predetermined speed, serving as a threshold value for changing the exciting current command value, is raised in accordance with the detected level.

Thus, there is provided an induction motor driving system which has an excellent response and which does not pose such problems as the generation of heat.

DESCRIPTION OF THE PREFERRED EMBODIMENTS

For a better understanding of the present invention, embodiments of the invention will be described in connection with the accompanying drawings with reference to the principle of vector control of an induction motor on which the present invention is founded. The embodiments will also be described with reference to a prior-art vector control system for an induction motor which applies the principle of vector control and which forms the basic technique of the present invention.

Figure 1:
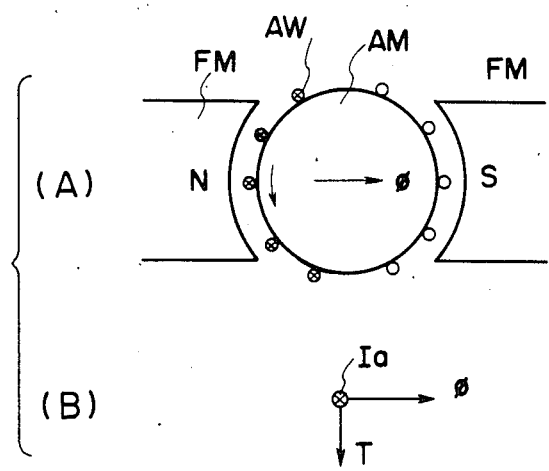
FIGS. 1(A) and (B) are diagrams for explaining the operation of a D.C. motor.

First, vector control will be described. In general, the torque generating mechanism of a shunt D.C. machine is to commutate currents by means of a commutator so that an armature current $I_a$ may always interest a main magnetic flux $\psi$ orthogonally, as shown in FIGS. 1(A) and 1(B). A generated torque T is indicated by the following equation, and it is proportional to the armature current $I_a$ when the main magnetic flux $\psi$ is constant:

$$T = K I_a \psi \tag{1}$$

In FIG. 1(A), FM denotes a field pole, AM an armature, and AW an armature winding.

When the above relationship is applied to an induction motor, $\psi$ can be caused to correspond to the magnetic flux vector $\dot{\psi}_2$ of a rotor and $I_a$ to the secondary current vector $\dot{I}_2$ thereof. Accordingly, in order to drive the induction motor equivalently to the shunt D.C. machine as regards the torque generation, the relation between the magnetic flux vector $\dot{\psi}_2$ and secondary current vector $\dot{I}_2$ of the rotor may be controlled as shown in FIG. 1(B). In other words, so that the magnetic flux vector $\dot{\psi}_2$ and the secondary current vector $\dot{I}_2$ intersect orthogonally at all times. In this way, the vector control ensures the orthogonal relation between the magnetic flux vector $\dot{\psi}_2$ and the current vector $\dot{I}_2$. When the secondary leakage inductance is neglected, a generated torque T is expressed by the following equation:

$$T = K\dot{I}_2 \times \dot{\psi}_2 = KI_2\psi_2 \approx KI_2\psi_m \tag{2}$$

(where $\psi_m$ denotes a main magnetic flux which is produced by an exciting current $I_m$)

Figure 2:
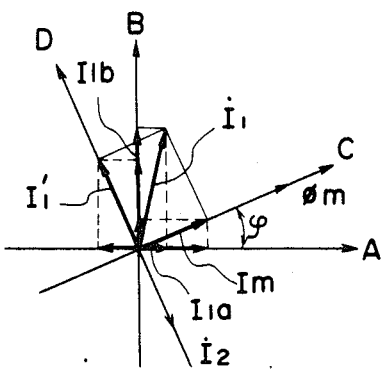
FIG. 2 is a vector diagram of a two-phase induction motor.

Next, a method of driving a two-phase induction motor on the basis of the vector control is explained. FIG. 2 is a vector diagram of the two-phase induction motor, in which C-D axes form a coordinate system coincident with the phase of the main magnetic flux $\psi_m$ and A-B axes form the fixed coordinate system of a stator. $\dot{I}_1$ denotes a stator current (primary current), $I_m$ an exciting current component and $I_1'$ a primary load current component, and $I_{1a}$ and $I_{1b}$ denote the A-axial and B-axial components of the stator current $\dot{I}_1$ and are the A-phase stator current and B-phase stator current.

Figure 3:
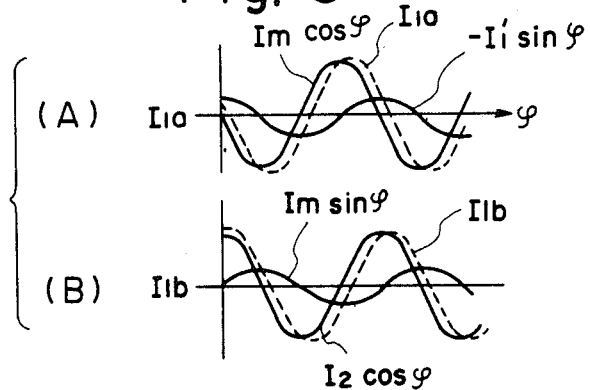
FIG. 3 are waveform diagrams of stator currents of the two-phase induction motor.

Assuming now that the main magnetic flux $\psi_m$ is rotating at a rotating angle (letting an angular velocity be $\omega, \phi = \omega t$) with respect to the fixed system of the stator, the A-phase stator current $I_{1a}$ and B-phase stator current $I_{1b}$ are expressed by the following equations and become as shown in FIGS. 3(A) and (B), respectively:

$$I_{1a} = I_m \cos\phi - I_1' \sin\phi \tag{3}$$

$$I_{1b} = I_m \sin\phi + I_1' \cos\phi \tag{4}$$

The primary load current $I_1'$ and the secondary current $I_2$ differ in phase by 180° from each other, and the following magnitude relation exists:

$$I_2 = KI_1' \tag{5}$$

Here, K denotes the turn ratio between the primary side and the secondary side, which depends upon the ratio of the number of phases.

Figure 4:
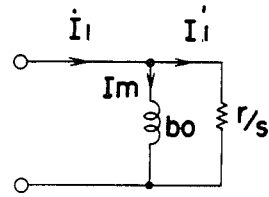
FIG. 4 is an equivalent circuit of an induction motor in FIG. 3.

In vector control, the A-phase and B-phase stator currents $I_{1a}$ and $I_{1b}$ indicated in Equations (3) and (4) are produced and are conducted through stator windings (primary windings) to drive the induction motor. In such vector control system, when a load has increased or decreased, only the primary load current (secondary current) is responsively increased or decreased, whereas the exciting current $I_m$ is held constant. FIG. 4 is an equivalent circuit of the induction motor, and the reason why only the primary load current $I_1'$ is varied in accordance with the change of the load will be explained with reference to this figure. In FIG. 4, $b_o$ indicates an excitation susceptance, r an equivalent resistance, and s a slip. When the load of the induction motor has increased, the slip s increases, r/s decreases and the primary load current $I_1'$ (secondary current $I_2$) increases in accordance with the load, but the exciting current $I_m$ remains constant. In vector control, therefore, only the primary load current $I_1$, is varied when the load is increased or decreased.

Figure 5:
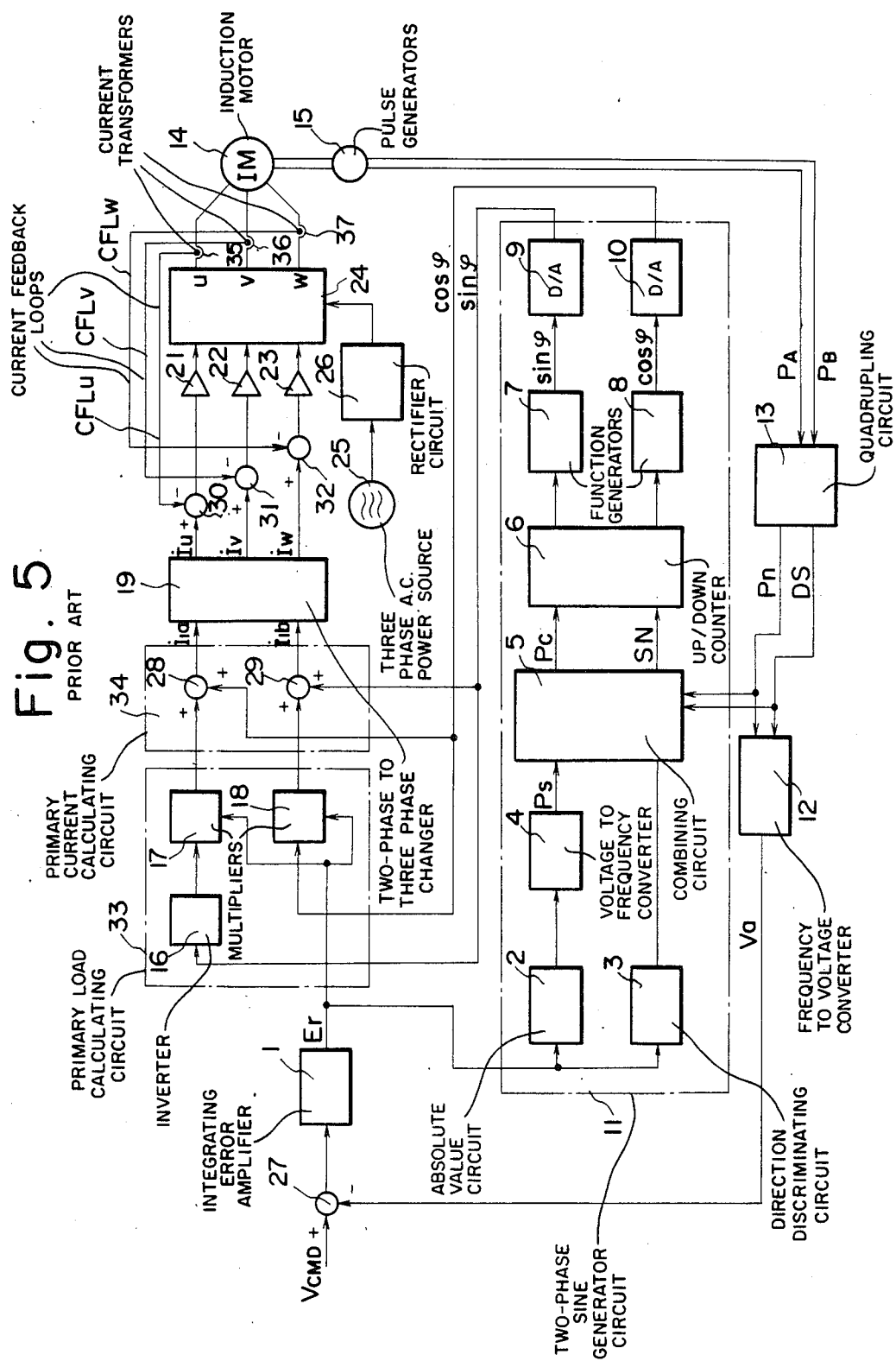
FIG. 5 is a block diagram of a prior art vector control circuit.

FIG. 5 is a block diagram of the vector control system. Numeral 1 designates a proportional integrating type error amplifier, numeral 2 an absolute-value circuit which converts the output of the error amplifier 1 into an absolute value, numeral 3 a direction discriminator circuit, and numeral 4 a voltage-to-frequency converter (VF converter) which povides pulses $P_s$ having a frequency proportional to the level of an analog signal delivered by the absolute-value circuit 2 (the frequency being equal to four-times the slip frequency). Numeral 5 designates a combining circuit, which combines the output pulses $P_s$ of the VF converter 4 and pulses $P_n$ having a frequency proportional to the rotational speed of an induction motor and which delivers a train of combined pulses $P_c$ and sign signals SN of the respective pulses. Numeral 6 indicates an up-down counter, which counts up or counts down the pulses $P_c$ in accordance with the sign signals SN. Shown at numerals 7 and 8 are function generators which receive the count values of the up-down counter 6 and which provide a sine wave (digital value) $\sin\phi$ and a cosine wave (digital value) $\cos\phi$ in accordance with the count values.

Figure 6:
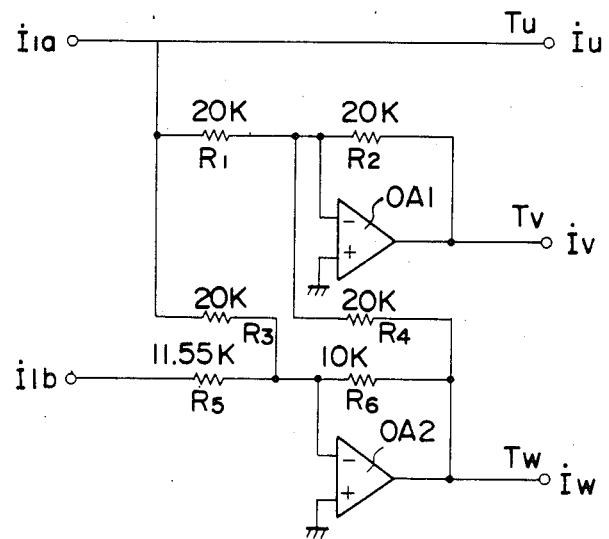
FIG. 6 is a circuit diagram of a two-phase to three-phase converter circuit employed in FIG. 5.

Numerals 9 and 10 indicate D/A converters which convert the received digital values of the sine and cosine waves into analog values. A two-phase sine-wave generator circuit 11 is constructed of the circuits extending from the absolute-value circuit 2 to the D/A converter 10. Numeral 12 indicates a frequency-to-voltage converter (hereinbelow, abbreviated "F-V converter"). Numeral 13 indicates a quadrupling circuit by which rotation signals $P_A$ and $P_B$ of the A-phase and B-phase having a phase difference of 90° and delivered by a pulse generator 15 directly connected to the rotary shaft of the induction motor 14 are converted into the pulses $P_n$ having the frequency four-times that of the rotation signals and which discriminates the phases of the rotation signals $P_A$ and $P_B$ so as to transmit a direction discrimination signal DS. Numeral 16 indicates an inverter circuit, numerals 17 and 18 indicate multiplier circuits, and numeral 19 indicates a two-phase to three-phase changer circuit which changes two-phase signals into three-phase signals and which has a circuit arrangement as shown in FIG. 6. The two-phase to three-phase changer circuit has two operational amplifiers $OA_1$ and $OA_2$, resistors $R_1$-$R_4$ of 20 K$\Omega$, a resistor $R_5$ of 11.55 K$\Omega$ and a resistor $R_6$ of 10 K$\Omega$. When the resistances of the respective resistors $R_1$-$R_6$ are determined as mentioned above and the components are connected as shown in the figure, the following are respectively provided from terminals $T_u$, $T_v$ and $T_w$:

$$\dot{I}_u = \dot{I}_{1a}$$

$$\dot{I}_v = -\frac{1}{2}\dot{I}_{1a} + \frac{\sqrt{3}}{2}\dot{I}_{1b}$$

$$\dot{I}_w = -\frac{1}{2}\dot{I}_{1a} - \frac{\sqrt{3}}{2}\dot{I}_{1b}$$

$\dot{I}_u$, $\dot{I}_v$ and $\dot{I}_w$ are three-phase currents which are displaced in phase by $2\pi/3$ from one another.

Figure 7:
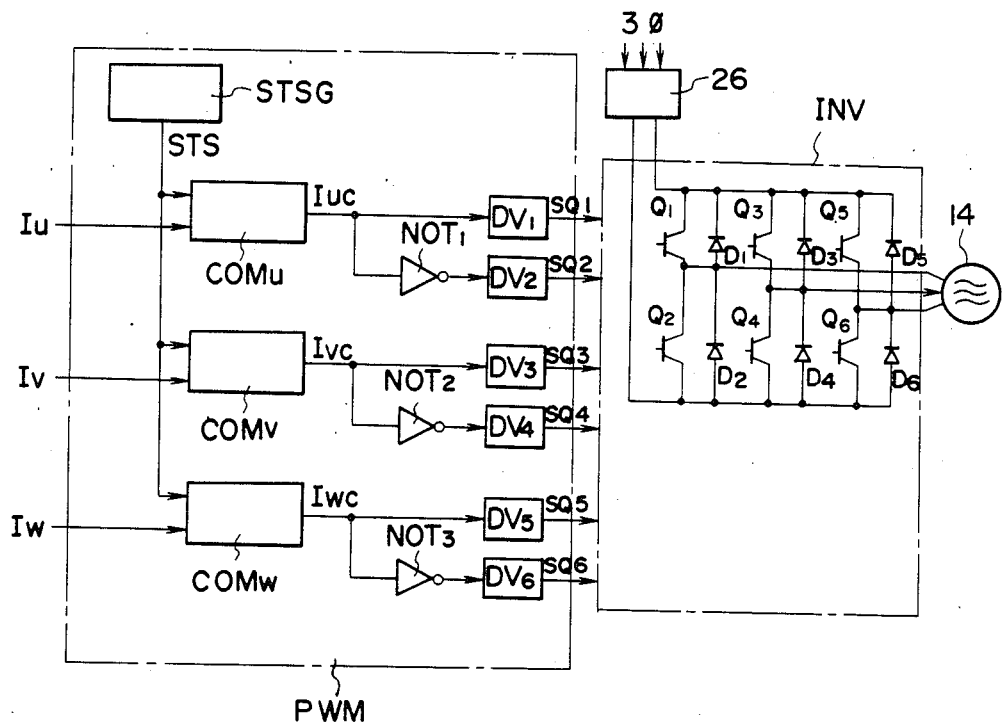
FIG. 7 is a circuit diagram of a pulse width control type inverter employed in FIG. 5.
Figure 8:
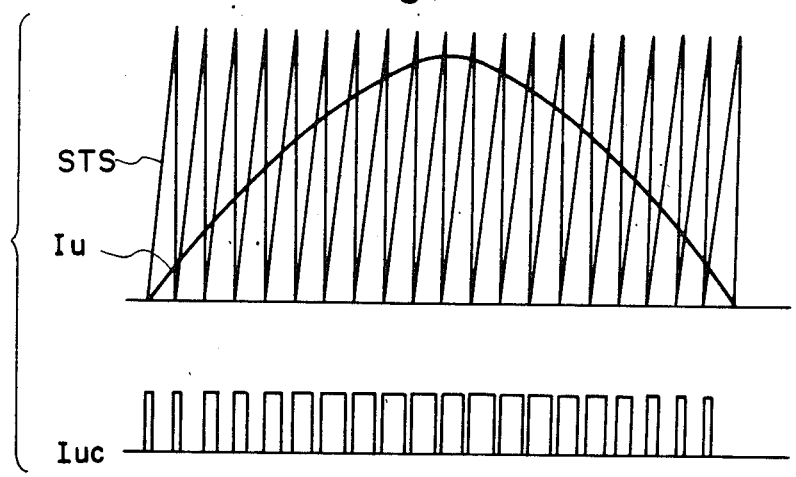
FIG. 8 is an operating waveform diagram of the inverter employed in FIG. 5.

Numerals 21–23 denote current amplifier circuits, numeral 24 a pulse width controlling inverter, numeral 25 a three-phase A.C. power source, and numeral 26 a rectifier circuit which rectifies three-phase alternating currents into direct current. The pulse width controlling inverter 24 has a pulse width modulator circuit PWM and an inverter INV as shown in FIG. 7. The pulse width modulator circuit PWM has a saw-tooth wave generator circuit for generating a saw-tooth wave signal STS, comparators $COM_u$, $COM_v$ and $COM_w$, NOT gates $NOT_1$-$NOT_3$ and drivers $DV_1$-$DV_6$, while the inverter INV has six transistors $Q_1$-$Q_6$ and diodes $D_1$-$D_6$. The comparators $COM_u$, $COM_v$ and $COM_w$ compare the amplitudes of the saw-tooth wave signal STS and the three-phase A.C. signals $I_u$, $I_v$ and $I_w$, and they provide logical "1" when $I_u$, $I_v$ and $I_w$ are greater than the value of STS and logical "0" when smaller, respectively. Thus, for $I_u$, a pulse-width-modulated current command $I_{uc}$ shown in FIG. 8 is provided by the comparator $COM_u$. That is, three-phase current commands $I_{uc}$, $I_{vc}$ and $I_{wc}$ pulse-width-modulated in accordance with the amplitudes of $I_u$, $I_v$ and $I_w$ are provided. Subsequently, the NOT gates $NOT_1$-$NOT_3$ and the driver circuits $DV_1$-$DV_6$ convert these current commands $I_{uc}$, $I_{vc}$ and $I_{wc}$ into drive signals $SQ_1$-$SQ_6$, which control the corresponding power transistors $Q_1$-$Q_6$ constituting the inverter INV.

Numerals 27–32 denote adder or subtractor circuits, symbols $CFL_u$, $CFL_v$ and $CFL_w$ current feedback loops, and numerals 35–37 current transformers for detecting the primary currents of the U, V and W-phases.

The inverter circuit 16 and the multiplier units 17 and 18 comprise a primary load current calculating circuit, and the adder or subtractor circuits 28 and 29 comprise a primary current calculating circuit.

Now, the operation of the above example will be described. In order to rotate the motor at a desired rotational speed, a speed command signal $V_{CMD}$ having a predetermined analog value is applied by a speed command circuit, not shown, to the input end of the adder or subtractor circuit 27. It is assumed that the induction motor 14 is rotating under a predetermined load at a rotational speed which is lower than the command speed by a slip S. The rotational speed of the induction motor 14 is detected by the pulse generator 15 which functions as a speed detector, and the two pulse trains (rotation signals) $P_A$ and $P_B$, that have a frequency proportional to the rotational speed of the induction motor and have phases shifted $\pi/2$ from each other, are generated. Both the pulse trains $P_A$ and $P_B$ are applied to the quadrupling circuit 13, and are converted into the pulse train $P_n$ having the quadruple frequency. Subsequently, the pulse train $P_n$ is converted into analog signals by the F-V converter 12, and the resulting speed signal $V_a$ is applied to the adder or subtractor circuit 27. The difference signal $E_r$ between the speed command signal and the aforementioned speed signal is applied to the absolute value circuit 2 and the direction discriminator circuit 3 through the error amplifier 1. The error amplifier 1 executes proportional-plus-integral calculations indicated by the following equations:

$$E_r = K_1(V_{CMD}-V_a) + K_2\Sigma(V_{CMD}-V_a) \quad (6)$$

$$\Sigma(V_{CMD}-V_a) = \Sigma(V_{CMD}-V) + (V_{CMD}-V) \quad (7)$$

The absolute-value circuit 2 converts the output of the error amplifier 1 into an absolute value, while the direction discriminator circuit 3 discriminates the sign of the voltage delivered from the error amplifier 1 and provides logical "1" for the plus sign and logical "0" for the minus sign. The signal delivered from the absolute-value circuit 2 indicates the slip S, in other words, the state of the load imposed on the induction motor 14, and the signal voltage becomes large for an increase in the load and small for a decrease in the load. The VF converter 4 provides the pulses $P_s$ of the frequency proportional to the voltage delivered from the absolute-value circuit 2. The frequency of the pulses $P_s$ is quadruple the slip frequency.

The combining circuit 5 combines the output pulses $P_s$ of the VF converter 4 and the pulses $P_n$ from the quadrupling circuit 13, and provides the combined pulses. The up-down counter 6 counts up or counts down the output pulses $P_c$ of the combining circuit in accordance with the signs SN thereof. The count values of the up-down counter 6 are subsequently applied to the function generators 7 and 8, and converted into the digital sine wave signal $\sin\phi$ and cosine wave signal $\cos\phi$ by these function generators. Here, $\phi$ is equal to $(\omega_s+\omega_n)t$ in which $\omega_s$ denotes the slip angular frequency and $\omega_n$ the rotating angular frequency of the motor 14. That is, the maximum values of the digital sine wave $\sin\phi$ and cosine wave $\cos\phi$ are constant, and only the frequencies thereof change. Next, the digital sine and cosine waves sin φ and cos φ are respectively applied to the D/A converters 9 and 10, in which they are converted into analog sine and cosine waves sin φ and cos φ. Referring to FIG. 2, both the sine and cosine wave voltages sin φ and cos φ are the A- and B-phase components of the exciting current, the amplitudes of which are constant irrespective of the increase or decrease of the load imposed on the motor 14. The analog sine and cosine wave signals sin φ and cos φ delivered from the D/A converters 9 and 10 and the output $E_r$ of the error amplifier 1 are multiplied in the primary load current calculating circuit 33 to create primary load current components ($-I_1'\cdot\sin\phi$) and ($I_1'\cdot\cos\phi$) for the two phases as have crest values varying in according with the change of the load. In the primary current calculating circuit 34 composed of the adder or subtractor circuits 28 and 29, the exciting current components cos φ and sin φ are respectively added to the primary load current components for the two phases, to create the stator current $\dot{I}_{1a}=\cos\phi-I_1'\cdot\sin\phi$ of the A-phase and the stator current $\dot{I}_{1b}=\sin\phi+I_1'\cdot\cos\phi$ of the B-phase having a phase lag of 90° from the former. Thereafter, using the stator currents $\dot{I}_{1a}$ and $\dot{I}_{1b}$ for the two phases, the three-phase A.C. signals $I_u$, $I_v$ and $I_w$ are generated in the two-phase to three-phase changer circuit 19 and are applied to the comparators $COM_u$, $COM_v$ and $COM_w$ (FIG. 7). The respective comparators $COM_u$, $COM_v$ and $COM_w$ compare the amplitudes of the saw-tooth wave signal STS and the three-phase current commands $I_u$, $I_v$ and $I_w$ and provide the pulse-width-modulated current commands, $I_{uc}$, $I_{vc}$ and $I_{wc}$ of the three phases, which are passed through the NOT gates $NOT_1$–$NOT_3$ and the drivers $DV_1$–$DV_6$ so as to provide the inverter driving signals $SQ_1$–$SQ_6$. These inverter driving signals $SQ_1$–$SQ_6$ are respectively applied to the bases of the power transistors $Q_1$–$Q_6$ comprising the inverter INV, and control the corresponding power transistors $Q_1$–$Q_6$ so as to supply three-phase induction currents to the three-phase induction motor 14. Thenceforth similar controls are performed until the motor 14 finally rotates at the command speed. In this manner, the vector control permits the instantaneous value control. However, when the rotational speed of the induction motor becomes high, the frequency of the primary current command becomes high. The high primary frequency approximates the chopping frequency of the transistor forming the inverter, and the waveform of the primary input voltage approximates a rectangular wave, so that the current loop gain of the system lowers. As a result, the current as commanded fails to flow through the induction motor.

In order to correct this fault, the present invention has improved this fundamental technology by adding a new technique thereto.

Figure 9:
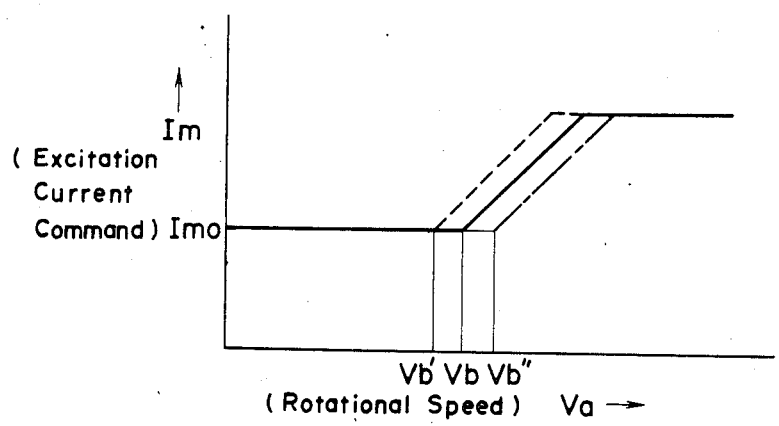
FIG. 9 is a diagram of a rotational speed-exciting current command characteristic according to the present invention.
Figure 10:
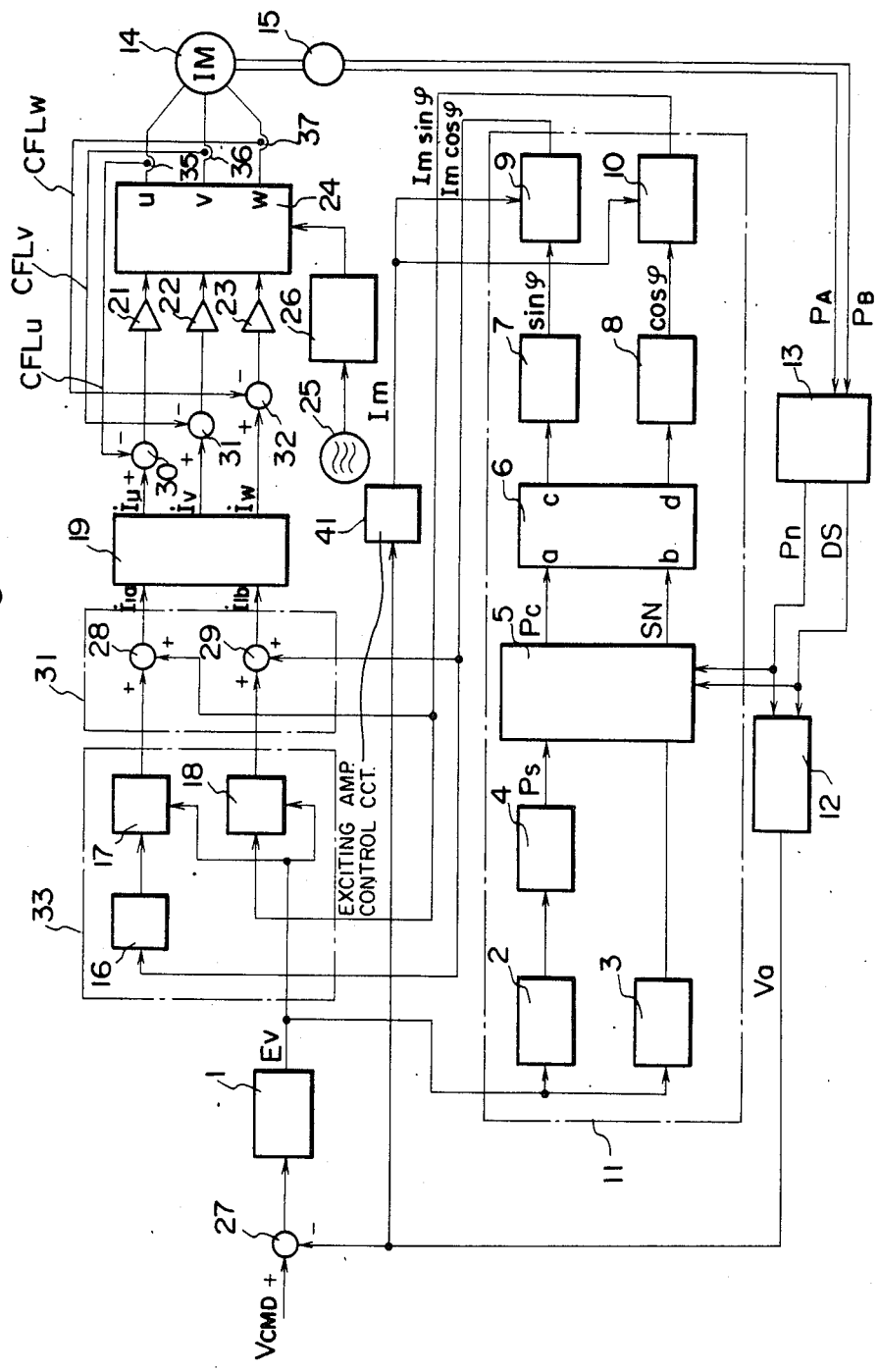
FIG. 10 is a block diagram of the circuit for producing the characteristic of FIG. 9.

FIG. 9 is a diagram of rotational speed-exciting current command characteristics according to the present invention, and FIG. 10 is a block diagram of the circuit for achieving the current command characteristics of FIG. 9.

As apparent from the solid line in FIG. 9, the exciting current command value $I_m$ is held at a constant value ($=I_{mo}$) until a base speed $V_b$, e.g., 1500 rpm, is increased in accordance with the rotational speed $V_a$ which is above $V_b$.

The point of difference of the embodiment of the present invention in FIG. 10 from the fundamental technology in FIG. 5 is that an exciting current amplitude-controlling circuit 41 is disposed so as to receive the rotational speed $V_a$ at an input terminal thereof and to output the amplitude signal $I_m$, shown in FIG. 9, from an output terminal thereof. As a result, $I_m \sin\phi$ and $I_m \cos\phi$ are respectively output fron the D/A converters 9 and 10, and the exciting current command value is increased in accordance with the rotational speed $V_a$ which is higher than the base speed $V_b$.

Figure 11:
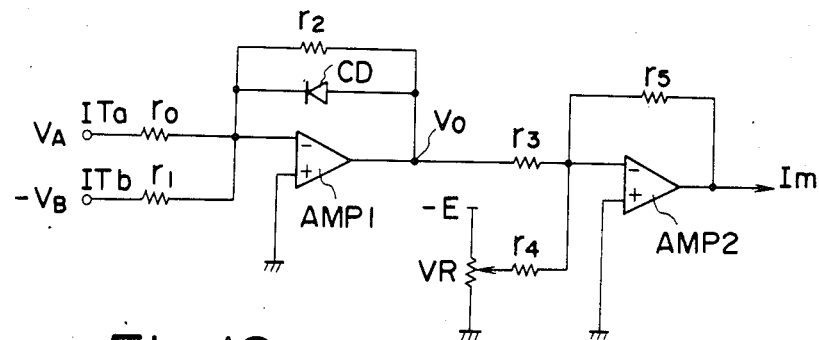
FIG. 11 is a circuit diagram of an exciting current amplitude controller in FIG. 10.
Figure 12:
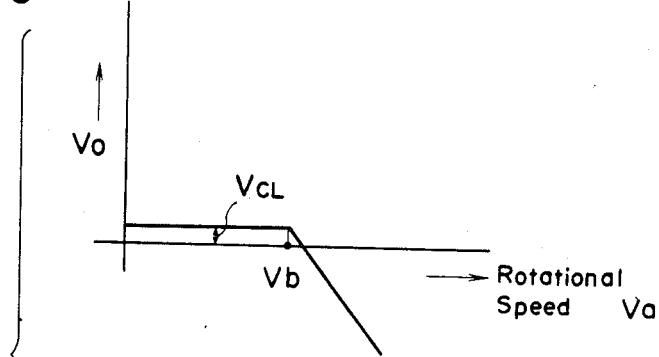
FIGS. 12(a) and (b) are waveform diagrams at particular portions of the controller of FIG. 11.
Figure 12:
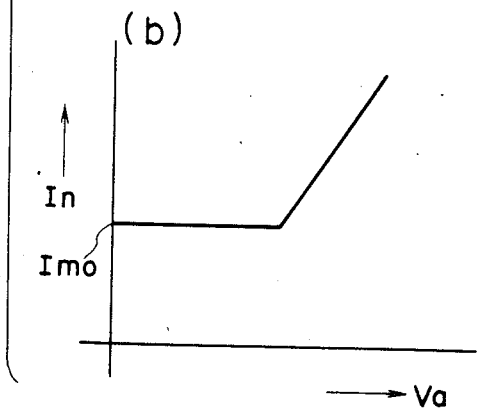

FIG. 11 is a detailed diagram of the exciting current amplitude-controlling circuit, and FIG. 12 shows waveforms at various parts of the circuit. In FIG. 11, $r_0$–$r_5$ denote resistors, CD a clamping diode, VR a variable resistor, and $AMP_1$–$AMP_2$ amplifiers. An input terminal $IT_a$ is supplied with an actual speed voltage $V_A$ corresponding to the rotational speed $V_a$, while an input terminal $IT_b$ is supplied with a negative voltage ($-V_B$) corresponding to the base speed $V_b$.

When the rotational speed $V_a$ is not higher than the base speed $V_b$ ($V_A-V_B\leq 0$), the output voltage $V_o$ of the amplifier $AMP_1$ becomes a clamp voltage value $V_{CL}$ dependent upon the clamping diode CD, and when the rotational speed $V_a$ is higher than the base speed $V_b$ ($V_A-V_B>0$), the output voltage $V_o$ of the amplifier $AMP_1$ decreases in the minus direction with a rise in the rotational speed $V_a$ (FIG. 12(a)). The output voltage $V_o$ of the amplifier $AMP_1$ is inverted by the amplifier $AMP_2$ and converted into an amplitude signal $I_m$ shown in FIG. 12(b), this signal being provided as an output. The variable resistor VR serves to generate an amplitude $I_{mo}$ at the lower speeds.

According to the induction motor driving system of FIG. 10 as described above, at the high speeds, the command exciting current value is increased in accordance with the rotational speed, so that the current as commanded can be caused to flow. With this method, however, when a driving supply voltage has changed, for example, has risen, the exciting current flows excessively, so that the induction motor generates heat.

Figure 13:
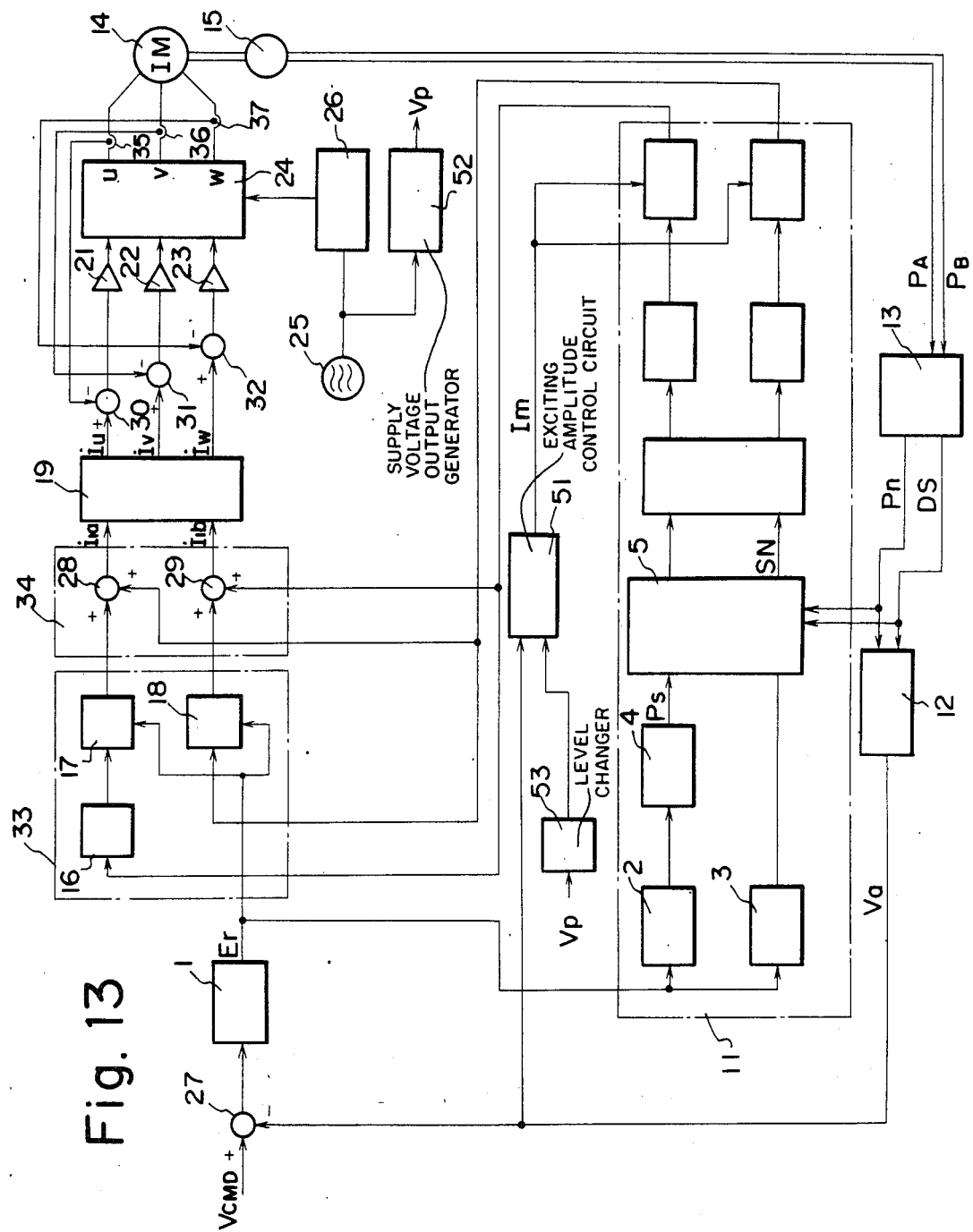
FIG. 13 is a block diagram of another embodiment according to the present invention.
Figure 14:
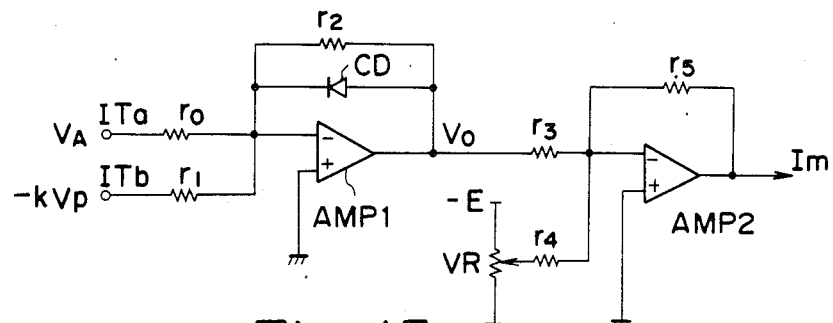
FIG. 14 is a circuit diagram of an exciting current amplitude controller.
Figure 15:
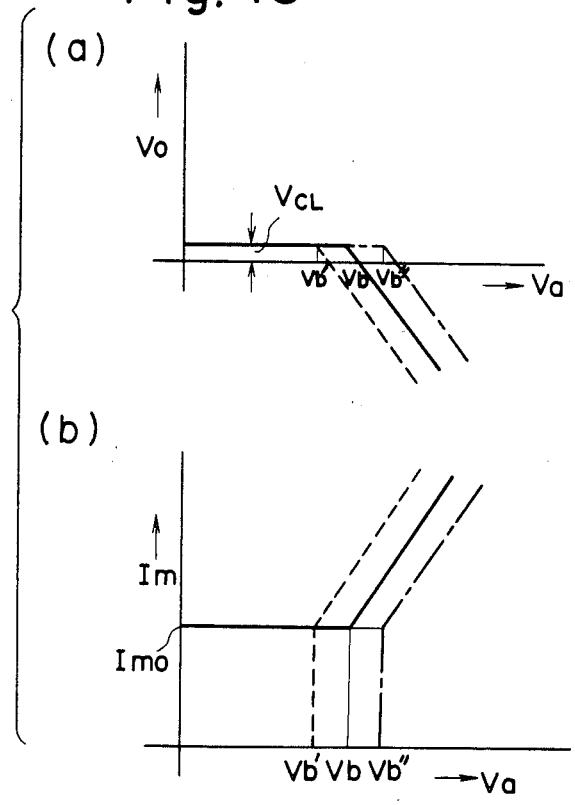
FIGS. 15(a) and (b) are waveform diagrams at particular portions of the controller.

FIGS. 13, 14 and 15 are diagrams of another embodiment of the present invention according to which even when the driving supply voltage has risen, the induction motor does not generate heat, and even when the rotational speed has risen, the current as commanded can be caused to flow. FIG. 13 is a block diagram, FIG. 14 is a circuit diagram of an exciting current amplitude-controlling circuit, and FIG. 15 shows waveforms at different parts in the circuit.

When the base speed $V_b$ in FIG. 9 is fixed, even in case of the rise of the driving supply voltage, the motor falls into an overexcited state and generates heat along with the fact that the exciting current command has been increased above the base speed $V_b$.

In the present invention, therefore, when the supply voltage has risen, the base speed is changed into $V_b''$ ($>V_b$) as indicated by a dot-and-dash line, and when the supply voltage has lowered, the base speed is changed into $V_b'$ ($<V_b$) as indicated by a dotted line. That is, the rotational speed at which the vector control is shifted to the slip control, is changed depending upon the magnitude of the supply voltage. When the supply voltage is large, the present invention carries out the vector control of holding the exciting current constant at rotational speeds at and below $V_b''$ and the slip control maintains the exciting current constant at rotational speeds above $V_b''$. When the vector control is performed at $V_b$–$V_b''$, usually current does not flow through the motor as commanded, but in case of a large supply voltage, the current can be caused to flow through the motor as commmanded and in quick response. When the slip control is performed at above $V_b''$, it may be feared that the exciting current will flow excessively along with the increase of the supply voltage, resulting in the generation of heat by the motor. In actuality, however, when the rotational speed is high, the susceptance $b_o(=\omega L)$ indicated in FIG. 4 increases, so that the exciting current does not flow excessively and the current flows as commanded.

The point of difference of FIG. 13 from FIG. 5 is the disposition of an exciting current amplitude-controlling circuit 51, a supply voltage output circuit 52 for providing a supply voltage $V_p$, and a level changer 53 for changing the supply voltage $V_p$ to $k \cdot V_p$ (k being a constant value). Although not illustrated in detail, the supply voltage output circuit 52 is constructed of a transformer and a diode and performs the half-wave rectification to deliver the supply voltage $V_p$, and the level changer 53 changes the supply voltage $V_p$ to the level $k \cdot V_p$ matching with an actual speed voltage $V_A$. As illustrated in FIG. 14, the exciting current amplitude-controlling circuit 51 has the same arrangement as that of the exciting current amplitude-controlling circuit 41 in FIG. 11, and it has its input terminals $IT_a$ supplied with the voltage $V_A$ corresponding to the actual speed $V_a$ and has its input terminal $IT_b$ supplied with $k \cdot V_p$ which varies in dependence on the supply voltage. Accordingly, when the supply voltage $V_p$ is great, the amplitude signal $I_m$ increases in accordance with the rotational speed $V_a$ at rotational speeds of above $V_b''$ as shown in FIG. 15(b), and when the supply voltage $V_p$ is small, the amplitude signal $I_m$ begins to increase in accordance with the rotational speed $V_a$ at the rotational speed $V_b'$. As a result, the exciting current components, namely the outputs of the D/A converters 9 and 10, have their increasing point (base speed) changed from $V_b'$ to $V_b''$ in accordance with the magnitude of the supply voltage.

As set forth above, according to the present invention, even when a rotational speed has become high in the vector control, current as commanded can be caused to flow through an induction motor, and an induction motor control of quick response can be realized. Accordingly, the induction motor is applicable also to precise control having heretofore been impossible without resorting to D.C. motors, and this can contribute to curtailing the cost of equipment. In addition, even when a supply voltage has changed, the motor is not overexcited and can be prevented from generating heat. Therefore, even when a driving device is exported to a foreign country where a driving supply voltage is unequal to that in Japan, it can be operated with domestic specifications left unchanged. This permits unification in the design or fabrication rotational driving devices, and also permits a reduction in the price of the driving devices.

What is claimed is:

1. An induction motor driving system operatively connected to an induction motor generating a rotational speed signal and a driving supply voltage and operatively connected to receive an exciting current command signal, said induction motor driving system comprising:
 exciting current amplitude controlling means, operatively connected to the induction motor, for receiving the rotational speed signal and outputting an amplitude signal;
 means, operatively connected to said exciting current amplitude controlling means and the induction motor, for receiving the amplitude signal and increasing the current amplitude of the induction motor in dependence upon the amplitude signal;
 detecting means, operatively connected to the induction motor, for receiving and detecting the level of the driving supply voltage of the induction motor and varying the rotational speed signal in accordance with the level of the driving supply voltage;
 a supply voltage output circuit providing a supply voltage; and
 a level changer, operatively connected between said supply voltage output circuit and said exciting current amplitude controlling means, for receiving and level changing the supply voltage and providing the level changed supply voltage and the rotational speed signal to said exciting current amplitude controlling means.

2. An induction motor driving system according to claim 1, further comprising:
 a supply voltage output circuit for providing a supply voltage; and
 a level changer, operatively connected between said supply voltage output circuit and said exciting current amplitude controlling circuit, for receiving and level changing the supply voltage and providing the level changed supply voltage and the rotational speed signal to said exciting current amplitude controlling circuit.

3. An induction motor driving system operatively connected to an induction motor generating a rotational speed signal, and operatively connected to receive an exciting current command signal, comprising:
 exciting current amplitude controlling means, operatively connected to the induction motor, for receiving the rotational speed signal and outputting an amplitude signal;
 means, operatively connected to said exciting current amplitude controlling means and the induction motor, for receiving the amplitude signal and increasing tnhe current amplitude of the induction motor in dependence upon the amplitude signal, thereby increasing the rotational speed of the induction motor;
 a supply voltage output circuit providing a supply voltage; and
 a level changer, operatively connected between said supply voltage output circuit and said exciting current amplitude controlling means, for receiving and level changing the supply voltage and providing the level changed supply voltage and the rotational speed signal to said exciting current amplitude controlling means.

4. An induction motor driving system according to claim 3, further comprising:
 a supply voltage output circuit for providing a supply voltage; and
 a level changer, operatively connected between said supply voltage output circuit and said exciting current amplitude controlling circuit, for receiving and level changing the supply voltage and providing the level changed supply voltage and the rotational speed signal to said exciting current amplitude controlling circuit.

* * * * *

UNITED STATES PATENT AND TRADEMARK OFFICE
CERTIFICATE OF CORRECTION

PATENT NO. : 4,680,525

DATED : JULY 14, 1987

INVENTOR(S) : KATSUO KOBARI ET AL.

It is certified that error appears in the above-identified patent and that said Letters Patent is hereby corrected as shown below:

FRONT PAGE [57] ABSTRACT, line 5, after "circuit" insert --. When--.

Col. 10, claim 2, delete claim 2 in its entirety;

line 42, "tnhe" should be --the--;

claim 4, delete claim 4 in its entirety.

Signed and Sealed this

First Day of March, 1988

Attest:

DONALD J. QUIGG

Attesting Officer

Commissioner of Patents and Trademarks